United States Patent Office 3,364,159
Patented Jan. 16, 1968

3,364,159
CURING VICINAL EPOXY COMPOUNDS AND CURING COMPOSITIONS THEREFOR
Arthur C. Hecker, Forest Hills, N.Y., Mark W. Pollock, Teaneck, N.J., and Seymour Cohen, Brooklyn, N.Y., assignors to Argus Chemical Corporation, Brooklyn, N.Y., a corporation of New York
No Drawing. Continuation-in-part of application Ser. No. 63,489, Oct. 19, 1960. This application Sept. 27, 1965, Ser. No. 490,681
6 Claims. (Cl. 260—18)

This application is a continuation-in-part of Ser. No. 63,489, filed Oct. 19, 1960, now abandoned, which is a continuation-in-part of Ser. No. 669,947, filed July 5, 1957, now abandoned.

This invention relates to a process of curing liquid vicinal epoxy compounds free from vinyl halide polymers, and to the resins obtained by this process, and more particularly to a combination with a slow curing agent of a curing assistant enhancing the rate of curing of the curing agent, so that the combination is capable of rapidly curing such resins to a hard resin of good color while maintaining a low viscosity through the initial stages of the cure.

Epoxy resins have received a wide acceptance since their development in the manufacture of protective surface coatings, varnishes, enamels, molding compositions, adhesives, films, fibers, and molded articles. These resins can be prepared in the form of partially polymerized liquids which are easily brought to the desired solid finished resin by the addition of a curing agent which is probably reactive with the free epoxy groups of the initial polymer, and enters the molecule of the final resin, and in this respect differs from the curing catalysts which are employed with other types of synthetic resins. For this reason, rather large amounts, as compared to catalytic amounts, are required.

A wide variety of curing agents have been proposed. Bender, Farnham and Guyer, Patent No. 2,506,486, suggest alkaline-reacting salts and basic nitrogen compounds, such as the organic amines and quaternary ammonium compounds. Bradley No. 2,541,027 suggest acidic organic orthophosphates. Shokal No. 2,633,458 to these adds sodium hydrosulfide and heterocyclic amines. Dannenberg No. 2,643,243 employ sulfonic acid or sulfonyl halides.

These curing agents are quite effective, and give a fast rate of cure. However, a rapid cure is not always desirable. The initial effect following addition of a rapid curing agent to the liquid polyepoxide is a rapid and appreciable increase in viscosity. This occurs even at room temperature, and after it has occurred, it is, of course, difficult to pour the resulting mix into a mold or other shaping apparatus. In many cases, it is desirable to stabilize the mix at a cure stage at which it has a low viscosity for a sufficient time to permit completion of any processing needed on the liquid, but after this induction period, the mix should develop a rapid rate of cure which proceeds more or less completely to solidification. These curing agents do not meet these requirements because they give a rapid complete cure with an initial rapid viscosity increase.

Other curing agents such as the anhydrides, carboxylic acids and phenols give a slow cure, which meets the requirements for a long induction period before the liquid solidifies, but unfortunately the cure continues at a slow rate beyond this stage, and in many cases the curing halts well short of completion. This problem is recognized in the art, and Shokal No. 2,768,153 seek to resolve it by combining agents of this type such as the anhydrides with an activator such as a phosphine, arsine, stibine or bismuthine.

In application Ser. No. 669,947, filed July 5, 1957, now abandoned, it is pointed out that the action of the slow curing agent can be considerably accelerated by mixing with it a polyvalent metal salt in a small amount. These salts are capable of increasing the rate of curing imparted by organic acids, anhydrides and phenols.

In accordance with the instant invention, the action of phosphorus-containing slow curing agents is considerably enhanced while at the same time retaining an adequate induction period during which the liquid vicinal epoxy compound remains flowable, as indicated in the prior application Ser. No. 669,947, by a polyvalent metal salt of an organic acidic compound, such as a carboxylic acid or a phenol. The slow curing agents whose actions are thus enhanced are any organic phosphorus compound which reacts slowly with epoxy groups, such as the phosphites, phosphates, phosphonates and posphinates.

In the presence of the polyvalent metal salt, it is still possible to hold the initial viscosity increase of the mix to a minimum without affecting the hardness which can be obtained with the curing agent. The salt however considerably accelerates the overall rate of cure, concentrating this acceleration principally in the stages of the cure beyond the induction period.

The composition of phosphorus-containing curing agent and polyvalent metal salt constitutes one embodiment of the invention. This composition can be made up as a mixture or solution in the proper proportions to effect the desired cure or set after addition to the epoxy resin.

The metal salt is a salt of a polyvalent metal and an organic acid having from about four to about eighteen carbon atoms. The acid should be monocarboxylic, and it should not contain nitrogen atoms in the molecule. Aliphatic, aromatic, alicyclic and oxygen-containing heterocyclic monocarboxylic acids are operative, as a class. The acids may be substituted, if desired, with groups such as halogen, sulfur and hydroxyl. The oxygen-containing heterocyclic acids include oxygen and carbon in the ring structure, of which alkyl-substituted furoic acids are exemplary. As exemplary of the acids there can be mentioned the following: butyric acid, valeric acid, caproic acid, capric acid, 2-ethyl hexoic acid, lauric acid, chloro-caproic acid, hydroxy capric acid, stearic acid, palmitic acid, oleic acid, myristic acid, dodecyl thioether propionic acid $C_{12}H_{25}$—S—$(CH_2)_2COOH$, hexahydrobenzoic acid, benzoic acid, phenylacetic acid, isobutyl benzoic acid, monoethyl ester of phthalic acid, ethyl benzoic acid, isopropyl benzoic acid, ricinoleic acid, p-t-butylbenzoic acid, n-hexyl benzoic acid, salicylic acid, naphthoic acid, 1-naphthalene acetic acid, orthobenzoyl benzoic acid, naphthenic acids derived from petroleum, abietic acid, dihydroabietic acid, and methyl furoic acid. These are used in the form of their metal salts, particularly the alkaline earth metal salts, such as magnesium, barium, strontium and calcium, and the aluminum, iron, zinc, cadmium, lead and tin salts. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

There also can be employed either in conjunction with the above metal salts or in lieu thereof a polyvalent metal salt of a hydrocarbon-substituted phenol. The hydrocarbon substituent contains from about four to about twenty-four carbon atoms. The metal can be an alkaline earth metal or other polyvalent metal such as barium, calcium, strontium, cadmium, lead, zinc, iron, aluminum and tin. Among such polyvalent metal phenolates there can be mentioned the magnesium, barium, calcium strontium, cadmium, lead, tin and zinc salts of n-butyl phenol, isoamyl phenol, isooctyl phenol, 2-ethylhexyl phenol, t-nonyl phenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, di-t-dodecyl phenol, and ortho or para phenyl phenol.

The phosphorus-containing slow curing agents whose curing rate can be enhanced by the above metal salts in accordance with the invention have at most one acidic hydrogen atom, and in many cases have no acidic hydrogen atom. The classes of phosphorus-containing slow curing agents coming within the invention include the following:

I. Esters of Phosphorous Acid (1) 

(2) 

II. Esters of Phosphonic Acid (1) 

(2) 

III. Esters of Phosphinic Acid (1) 

(2) 

IV. Esters of Phosphoric Acid (1) 

(2) 

In the above formulae, $R_1$, $R_2$ and $R_3$ represent an aliphatic, aromatic, cycloaliphatic or heterocyclic hydrocarbon radical having from one to about thirty carbon atoms. $R_1$, $R_2$ and $R_3$ in I, II, III and IV may be the same or different. Many of these curing agents are well known, and are disclosed as such in the literature.

Typical aliphatic radicals are methyl, ethyl, propyl, butyl, isobutyl, secondary butyl, 2-ethylhexyl, tertiary butyl, hexyl, octyl, dodecyl, octadecyl, octadecenyl, propenyl, decenyl, and hexenyl. Aromatic radicals include phenyl, naphthyl, benzyl, isooctyl phenyl, octyl phenyl, methyl phenyl, methyl naphthyl, 1,3-dimethyl phenyl, nonyl phenyl, and butyl phenyl. Among the cycloaliphatic radicals are cyclopentyl and cyclohexyl. Heterocyclic radicals include furfuryl and tetrahydrofurfuryl.

Exemplary phosphites are triphenyl phosphite, tribenzyl phosphite, isooctyl diphenyl phosphite, di-2-ethyl hexyl phenyl phosphite, diphenyl 2-ethyl hexyl phosphite, tributyl phosphite, tridodecyl phosphite, 2-ethyl hexyl di(isooctylphenyl) phosphite, tri(isooctylphenyl) phosphite, hexyl diphenyl phosphite, trinaphthyl phosphite, octadecyl butyl phenyl phosphite, phenyl cyclopentyl isooctyl phosphite, octadecenyl diphenyl phosphite, hexenyl diphenyl phosphite, di(decyl)phenyl phosphite, tritetrahydrofurfuryl phosphite, di(phenyl) phosphite, di(diphenyl) phosphite, di(cresyl) phosphite, di(o-isooctylphenyl) phosphite, di(p-ethylhexyl phenyl) phosphite, di(p-t-octylphenyl) phosphite, di(dimethylphenyl) phosphite, di-n-butyl phosphite, di-2-ethyl hexyl phosphite, isooctylphenyl phosphite, diisooctyl phosphite, 2-ethylhexyl phenyl phosphite, 2-ethylhexyl-(n-octylphenyl) phosphite, methylcyclohexyl phosphite, di(cyclohexyl) phosphite, di(2-cyclohexylphenyl) phosphite, di-alpha-naphthyl phosphite, diphenyl phenyl phosphite, di-(2-phenylethyl) phosphite, dibenzyl phosphite, n-butyl cresyl phosphite, didodecyl phosphite, ditetrahydrofurfuryl phosphite, difurfuryl phosphite.

Exemplary phosphates are triphenyl phosphate, tribenzyl phosphate, isooctyl diphenyl phosphate, di-2-ethyl hexyl phenyl phosphate, diphenyl-2-ethyl hexyl phosphate, tributyl phosphate, tridodecyl phosphate, 2-ethyl hexyl di(isooctylphenyl) phosphate, tri(isooctylphenyl) phosphate, hexyl diphenyl phosphate, trinaphthyl phosphate, octadecyl butyl phenyl phosphate, phenyl cyclopentyl isooctyl phosphate, octadecenyl diphenyl phosphate, hexenyl diphenyl phosphate, di(decyl)phenyl phosphate, tritetrahydrofurfuryl phosphate, di(phenyl) phosphate, dicresyl phosphate, di(dimethylphenyl) phosphate, di-n-butyl phosphate, di(p-t-octylphenyl) phosphate, di(o-t-octylphenyl)phosphate, di(2-ethylhexylphenyl) phosphate, di(2-ethylhexyl) phosphate, isooctylphenyl phosphate, diisooctyl phosphate, 2-ethylhexylphenyl phosphate, 2-ethylhexyl(p-t-octylphenyl) phosphate, di(cyclohexyl) phosphate, methylcyclohexyl phosphate, ditetrahydrofurfuryl phosphate, difurfuryl phosphate, di(2-cyclohexylphenyl) phosphate, di-alpha-naphthyl phosphate, di(diphenyl) phosphate, diphenyl phenyl phosphate, di(2-phenyl ethyl) phosphate, dibenzyl phosphate, n-butyl cresyl phosphate, di(dodecyl) phosphate.

Exemplary phosphonates are monoethyl benzene acid phosphonate, mono(2-ethylhexyl) benzene acid phosphonate, mono-n-butyl benzene acid phosphonate, isoamyl ethane acid phosphonate, 2-ethylhexyl cyclohexane acid phosphonate, dibutyl cyclohexane phosphonate, alpha-naphthyl butane acid phosphonate, benzyl hexane acid phosphonate, methyl-2-phenylethane acid phosphonate, cresyl toluene acid phosphonate, 2-cyclohexyl benzene acid phosphonate, and di(phenyl) benzene phosphonate, di(phenyl) ethane phosphonate, di(2-ethylhexyl) benzene phosphonate, di(2-ethylhexyl) 2-ethylhexane phophonate, di(cresyl) benzene phosphonate, di(phenyl) cyclohexane phosphonate, di(cyclohexyl) benzene phosphonate, di(tetrahydrofurfuryl) ethane phosphonate.

Exemplary phosphinic acids and esters are dibenzene phosphinic acid, di-2-ethylhexane phosphinic acid, di(t-octylbenzene) phosphinic acid, 2-ethylhexane benzene phosphinic acid, isobutane-2-ethylhexane phosphinic acid, di-n-propane phosphinic acid, di-alpha-naphthalene phosphinic acid, dicyclohexane phosphinic acid, ditoluene phosphinic acid, di(phenylmethane) phosphinic acid, di(2-phenyl ethane) phosphinic acid, di(phenyl benzene) phosphinic acid, 2-ethylhexane (t-octyl benzene) phosphinic acid, di(dimethylbenzene) phosphinic acid, methyl dibenzene phosphinate, ethyl di(2-ethylhexane) phosphinate, t-butyl di(t-octylbenzene) phosphinate, 2-ethylhexyl 2-ethylhexane benzene phosphinate, methyl di(alpha-naphthalene) phosphinate, isopropyl dicyclohexane phosphinate, cyclohexyl di(butane) phosphinate, isooctyl di(2-phenylethane) phosphinate isooctyl di(phenylmethane) phosphinate, xylyl di(xylene) phosphinate, and phenyl di(benzene) phosphinate.

The curing agent reacts with the epoxy groups of the epoxy resin, and usually is included in approximately a stoichiometrically equivalent amount but in many cases less than this amount will give a good cure. The amount used depends upon the epoxy value of the epoxy compound. The amount of curing agent will also depend on the rate of cure desired and the hardness of the final polymer. Good cures are obtained by reacting the epoxy compound with at least 0.5 equivalent of the curing agent. Preferably it is used in a ratio from 0.8 to 1.5 equivalent per epoxy value unit in the resin.

The polyvalent metal salt is needed in only very small amounts. Excellent results are obtained when the polyvalent metal salt is present in an amount ranging from 0.02 to 2% based on the percentage of metal present by weight of the resin. Preferably, the amount is within the range of 0.5 to 2% by weight of the resin. At excessively large amounts beyond these limits the hardness of the resin may be diminished, and accordingly the maximum amount that can be used is determined by the hardness.

The curing compositions of the invention are effective in the curing of any vicinal epoxy compounds free from vinyl halide polymer, containing at least two reactive epoxy groups

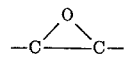

in their molecules. The epoxy groups can be contained in any type of organic compound having a saturated or unsaturated aliphatic, cycloaliphatic, aromatic or heterocyclic structure, and these compounds may bear substituents which are inert to the epoxide unit, such as chlorine atoms, or ether radicals, etc. The vicinal epoxy compounds may be monomeric or polymeric.

The vicinyl epoxy compound should have an epoxy equivalency greater than one. This is a term widely recognized in this art, and is defined in U.S. Patent No. 2,633,458 to Shokal, patented Mar. 31, 1953. Single monomeric vicinal epoxy compounds have their epoxide groups intact, and their epoxy equivalency is in whole integers representing the number of epoxy units per molecule. Polymeric materials have some of the epoxy groups reacted, and contain macromolecules of somewhat different molecular weight, so that the epoxy equivalent values may range above or below 2 and have decimal values, such as 1.5, 1.8, 2.5 and the like.

Exemplary of the vicinal epoxy compounds to which the invention is applicable are epoxidized triglycerides such as epoxidized glycerol trioleate, 1,4-bis(2,3-epoxy propoxy) diphenyl ether, 1,8-bis(2,3-epoxy propoxy) octane, 1,4-bis(2,3-epoxy propoxy) cyclohexane, and 1,3-bis(4,5-epoxy pentoxy) 5-chlorobenzene, the epoxy polyethers of polyhydric phenols, obtained by reacting a polyhydric phenol with a halogen-containing epoxide or halohydrin, such as the reaction products of resorcinol, catechol, hydroquinone, methyl resorcinol or polynuclear phenols such as 2,2-bis(4-hydroxy phenyl) propane (Bisphenol A), 2,2-bis(4-hydroxy phenyl) butane, 4,4'-dihydroxybenzophenone and 1,5-dihydroxy naphthalene with halogen-containing epoxides such as 3-chloro-1,2-epoxy butane, 3-chloro-1,2-epoxy octane, and epichlorohydrin.

These glycidyl polyethers of dihydric phenols are readily prepared in accordance with the teachings of the art by reacting the required proportions of the dihydric phenol and the halohydrin in an alkaline medium such as sodium or potassium hydroxide, preferably in stoichiometric excess to the halohydrin. The reaction is preferably accomplished at temperatures within the range from 50 to 150° C., and after several hours reaction the product is washed free of salt and base.

The vicinal epoxy compounds polymerized in accordance with the invention can of, course, have their epoxy units at any point of the molecule, and the invention is not limited to those wherein the epoxy unit is at the end of a chain, although this is probably the most frequently-occurring type of molecule. The above group includes not only the 1,2-epoxy compounds but also the 2,3-, 3,4-, and 4,5-epoxy compounds, and further variations will, of course be apparent.

In accordance with the process of the invention, the vicinal epoxy compound free from vinyl halide polymers is cured by admixing with the curing agent and polyvalent metal salt, and then allowing it to polymerize to a hard, solid polymer. The curing agent and metal salt can be combined together before being added to the vicinal epoxy compound, or they can be added separately.

To facilitate mixing, it is desirable to have the vicinal epoxy compound in a fluid condition. Liquid epoxy compounds that are too viscous for ready mixing may be heated, further to reduce viscosity, or a liquid solvent can be added. Normally solid epoxy compounds are either melted or dissolved in a suitable solvent. Such solvents are well known. Any of the solvents mentioned in Patent No. 2,768,153 to Shokal patented Oct. 23, 1956 can be employed.

In many cases it is convenient to employ a combination of a solid or semisolid epoxy compound and a liquid epoxy compound such as a normally liquid glycidyl polyether of a polyhydric alcohol.

In all cases, the metal salt does not interfere with the viscosity of the mix, and allows it to retain the initial viscosity for a considerable period, thus facilitating processing of the liquid prior to solidification.

The vicinal epoxy composition can if desired include other ingredients, such as pigments, fillers, dyes, plasticizers, and the like.

The curing temperature is not critical and will depend upon the resin. The curing agent-polyvalent metal salt combination is active at room temperature, i.e., temperatures of from 15 to 35° C. and the cure may be effected at these temperatures by merely mixing the combination with the polyepoxide and letting the mixture stand. A more rapid cure can be effected by increasing the temperature.

Ordinarily, the temperature of curing will be selected so as to enable a complete cure within about one hour's time. Moderate to fast rates of cure are obtainable at temperatures of from 50 to 110 C. and very fast rates of cure are obtained at temperatures of from 150 to 200° C. Temperatures above 200° C. ordinarily are not required but can be employed if desired. The higher the temperature the more rapid the cure.

The following examples, in the opinion of the inventors, represent the best embodiments of their invention:

*Example 1*

A glycidyl polyether type of polyepoxide resin was prepared as follows: About 2 moles of 2,2-bis(4-hydroxyphenyl) propane was dissolved in 10 moles of epichlorhydrin and 1 to 2% water added. The mixture was then brought to 80° C. and 4 moles of solid sodium hydroxide added in small portions over a period of about one hour. During the addition, the temperature of the mixture was held at about 90 to 110° C. After the sodium hydroxide had been added, the water formed in the reaction and most of the epichlorhydrin was distilled off. The residue that remained was combined with an approximately equal quantity by weight of benzene, and the mixture filtered to remove the salt. The benzene was then removed, leaving a viscous liquid having an epoxy value equivalent of 1.75 (0.5 per 100 grams).

The epoxidized bisphenol so produced was mixed in the proportion of 80 parts with 20 parts of the curing agents listed in the table which follows. For purposes of comparison in each case a parallel composition was prepared including as a polyvalent metal salt of the invention zinc 2-ethyl hexoate, in the amount indicated in the table, to show the accelerating effect of the metal salt upon these compositions. The compositions were prepared by stirring together the ingredients named in the proportions shown at room temperature, heating if necessary to convert the whole to a mixable consistency. In some cases, the mix did not form a clear homogeneous mass until heating was begun to cure. The cure was carried out at 350° F. for eighteen hours, and the hardness then determined.

Acceleration of the curing by the metal salt is demonstrated by the hardness of the final product. These hardnesses are reported as VL when the product was a viscous liquid, TS when the product was a tacky solid, and SS as a solid scratchable with the thumbnail. Beyond this hardness, the numerical Barcol hardnesses were determined. Each Barcol hardness set forth represents an average of 10 measurements.

TABLE I.—PHOSPHORUS COMPOUNDS AS CURING AGENTS

| Ingredient | Parts by Weight | | | | | |
|---|---|---|---|---|---|---|
| Epon 828 | 80 | 80 | 80 | 80 | 80 | 80 |
| Triphenyl phosphite | 29 | 20 | | | | |
| Tricresyl phosphate | | | 20 | 20 | | |
| Cyclohexane dibutyl phosphonate | | | | | 20 | 20 |
| Zinc octoate | | 0.5 | | 0.5 | | 0.5 |
| Product hardness | VL | 27 | VL | 24 | VL | 26 |

It is evident from each of these test compositions that the zinc 2-ethyl hexoate considerably increased the rate of cure and the hardness of the final product for a given amount of curing agent.

*Example 2*

A series of polyepoxide resin compositions was prepared employing as the polyepoxide resin Epon 828, a liquid resin having a Gardner color at 25° C. of 12, an epoxy equivalent of 200, an average molecular weight of 375, and a viscosity at 25° C. of 10,000 cp., the condensation product of Bisphenol A, 2,2-bis(4-hydroxyphenyl)propane, and epichlorhydrin, prepared in accordance with the procedure set forth in Example 1. The epoxidized bisphenol was mixed in the proportion of 80 parts with 20 parts of the curing agents listed in the table which follows, each curing agent being used in the amount stated in the table. For purposes of comparison, in each case a parallel composition was prepared including as a polyvalent metal salt of the invention zinc 2-ethyl hexoate, in the amount indicated in the table, to show the accelerating effect of the metal salt upon these compositions.

The compositions were prepared by stirring together the ingredients at room temperature, heating if necessary to convert the whole to a mixable consistency. In some cases the mix did not form a clear homogeneous mass until heating was begun to cure. The cure was carried out at 350° F. for eighteen hours, and the hardness then determined.

Acceleration of the curing by the metal salt is demonstrated by the hardness of the final product. This hardness is reported as SS, a solid scratchable with the thumbnail, or, if harder, determined as the numerical Barcol hardness. Each Barcol hardness set forth represents an average of 10 measurements.

The following observations were made:

TABLE II

| Ingredients | Parts by Weight | | | | | |
|---|---|---|---|---|---|---|
| Epon 828 | 80 | 80 | 80 | 80 | 80 | 80 |
| Diphenyl phosphite | 20 | 20 | | | | |
| Dibutyl phosphite | | | 20 | 20 | | |
| Dibutyl phosphate | | | | | 20 | 20 |
| Zinc 2-ethyl hexoate | | 0.5 | | 0.5 | | 0.5 |
| Product hardness | 23 | 33 | SS | 28 | 28 | 34 |

It is evident from each of these test compositions that the zinc-2-ethyl hexoate considerably increased the rate of cure and the hardness of the final product for a given amount of curing agent.

*Example 3*

A number of polyepoxide resin compositions were prepared employing as the polyepoxide Epon 828 and as the curing agent triphenyl phosphite, in the amount indicated in the table which follows, with a polyvalent metal salt of the invention, one of the salts listed in the table, added in the amount stated. A control without this salt was included to show the accelerating effect of the metal salt upon this composition.

The compositions were prepared by stirring together the ingredients at room temperature, heating if necessary to convert the whole to a mixable consistency. In some cases, the mix did not form a clear homogeneous mass until heating was begun to cure.

Acceleration of the curing by the metal salt was demonstrated by the hardness of the final product at the end of a two hour curing period at 350° F. The hardnesses are reported in accordance with the following numerical scale, in order of decreasing hardness from 1 to 5:

(1) Scratchable but non-brittle solid.
(2) Brittle and scratchable solid.
(3) Spongy and soft solid.
(4) Tacky solid.
(5) Liquid.

TABLE III

| Run No | 1 | 2 | 3 | 4 | 5 |
|---|---|---|---|---|---|
| Epon 828 | 100 | 100 | 100 | 100 | 100 |
| Triphenyl phosphite | 20 | 20 | 20 | 20 | 20 |
| Zinc naphthenate | | 0.1 | | | |
| Iron napthhenate | | | 0.1 | | |
| Zinc myristate | | | | 0.2 | |
| Aluminum 2-ethyl hexoate | | | | | 0.1 |
| Hardness | 5 | 1 | 1 | 1 | [1]B-25 |

[1] Barcol hardness.

It is evident from these test compositions that the polyvalent metal salts increased the rate of cure and the hardness of the final product for a given amount of triphenyl phosphite.

*Example 4*

A number of polyepoxide resin compositions were prepared, employing as the curing agent the phosphorus compound indicated in the table which follows, in the amount stated, with the polyepoxide Epon 562, a liquid glycidyl polyether of glycerol having a Gardner color at 25° C. of 5, an epoxy equivalent of 150, an average molecular weight of 300, and a viscosity at 25° C. of 175 cp. As the polyvalent metal salt of the invention, zinc 2-ethyl hexoate was employed, in the amount stated in the table, and controls without this salt were included to show the accelerating effect of the metal salt upon these compositions.

The compositions were prepared by stirring together the ingredients at room temperature, heating if necessary to convert the whole to a mixable consistency. In some cases, the whole mix did not form a clear homogeneous mass until heating was begun to cure. Curing was effected for eighteen hours at 350° F.

TABLE IV

| Ingredient | Parts by Weight | | | | | | | |
|---|---|---|---|---|---|---|---|---|
| Epon 562 | 80 | 80 | 80 | 80 | 80 | 80 | 80 | 80 |
| Benzene monoethyl acid phosphonate | 20 | 20 | | | | | | |
| Ethyl-di(2-ethylhexane) phosphinate | | | 20 | 20 | | | | |
| Di-2-ethylhexane phosphinic acid | | | | | 20 | 20 | | |
| Di(2-ethylhexyl) cyclohexane phosphonate | | | | | | | 20 | 20 |
| Zinc 2-ethyl hexoate | | 0.5 | | 0.5 | | 0.5 | | 0.5 |

In each case, the product obtained from the composition containing the zinc 2-ethyl hexoate was harder, and cured more rapidly, than the composition which did not contain this salt, thus demonstrating the accelerating effect of the salt upon the cure.

Having regard to the foregoing disclosure, the following is claimed as the inventive and patentable embodiments thereof:

1. A vicinal epoxy composition free from vinyl halide polymers, consisting essentially of an epoxy compound having an epoxy equivalency greater than 1 and a curing composition consisting essentially of an epoxy compound phosphorus-containing organic ester slow curing agent selected from the group consisting of esters of phosphorus acid, esters of phosphonic acid, esters of phosphinic acid, and esters of phosphoric acid having at most one acidic hydrogen atom, in an amount within the range from about 0.5 to about 1.5 equivalents per epoxy unit in the epoxy compound to be cured, and a zinc salt of an organic monocarboxylic acid having from about four to about eighteen carbon atoms and no nitrogen atoms, in an amount within the range from about 0.2 to about 2% based on the percentage of zinc by weight of the epoxy compound, sufficient to enhance the action of the slow curing agent, said composition being free from alkali metal halide.

2. A composition in accordance with claim 1 in which the phosphorus-containing slow curing agent is an ester of phosphorous acid.

3. A composition in accordance with claim 1 in which the phosphorus-containing slow curing agent is an ester of phosphoric acid.

4. A composition in accordance with claim 1 in which the phosphorus-containing slow curing agent is an ester of phosphonic acid.

5. A composition in accordance with claim 1 in which the phosphorus-containing slow curing agent is an ester of phosphinic acid.

6. A resinified product free from vinyl halide polymers consisting essentially of the reaction product of a vicinal epoxy compound having an epoxy equivalency greater than 1 with a curing composition consisting essentially of an epoxy compound phosphorus-containing organic ester slow curing agent selected from the group consisting of esters of phosphorous acid, esters of phosphonic acid, esters of phosphinic acid, and esters of phosphoric acid having at most one acidic hydrogen atom, in an amount within the range from about 0.5 to about 1.5 equivalents per epoxy unit in the epoxy compound to be cured, and a zinc salt of an organic monocarboxylic acid having from about four to about eighteen carbon atoms and no nitrogen atoms, in an amount within the range from about 0.2 to about 2% based on the percentage of zinc by weight of the epoxy compound, sufficient to enhance the action of the slow curing agent, said composition being free from alkali metal halide.

References Cited

UNITED STATES PATENTS

| | | | |
|---|---|---|---|
| 2,682,515 | 6/1954 | Naps | 260—18 |
| 2,856,369 | 10/1958 | Smith et al. | 260—45.7 |
| 2,953,537 | 9/1960 | McBrien | 260—45.7 |
| 2,997,454 | 8/1961 | Leistner et al. | 260—45.7 |
| 2,541,027 | 2/1951 | Bradley | 260—2 |
| 2,671,064 | 3/1954 | Cowell et al. | 260—45.75 |
| 2,716,092 | 8/1955 | Leistner et al. | 260—45.75 |
| 2,732,367 | 1/1956 | Shokal | 260—2 |
| 2,795,565 | 6/1957 | Newey | 260—837 |
| 2,837,258 | 6/1958 | Schlenker | 260—47 |

FOREIGN PATENTS

| | | |
|---|---|---|
| 729,258 | 5/1955 | Great Britain. |
| 1,008,909 | 10/1957 | Germany. |

GEORGE F. LESMES, *Primary Examiner.*

MURRAY TILLMAN, *Examiner.*

UNITED STATES PATENT OFFICE
CERTIFICATE OF CORRECTION

Patent No. 3,364,159

January 16, 1968

Arthur C. Hecker et al.

It is hereby certified that error appears in the above numbered patent requiring correction and that the said Letters Patent should read as corrected below.

Column 2, line 71, after "calcium" insert a comma; column 4, line 42, for "phophonate" read -- phosphonate --; column 7, TABLE I, second column, line 2 thereof, for "29" read -- 20 --; column 10, line 24, for "2,837,258" read -- 2,837,493 --.

Signed and sealed this 1st day of April 1969

(SEAL)

Attest:

Edward M. Fletcher, Jr.
Attesting Officer

EDWARD J. BRENNER
Commissioner of Patents